Sept. 2, 1924.

C. F. KETTERING ET AL 1,507,292

SYSTEM OF GAS CONTROL

Filed Feb. 3, 1917          2 Sheets-Sheet 1

Sept. 2, 1924.

C. F. KETTERING ET AL

SYSTEM OF GAS CONTROL

Filed Feb. 3, 1917

Patented Sept. 2, 1924.

1,507,292

UNITED STATES PATENT OFFICE.

CHARLES F. KETTERING AND WILLIAM A. CHRYST, OF DAYTON, OHIO, ASSIGNORS, BY MESNE ASSIGNMENTS, TO DELCO-LIGHT COMPANY, OF DAYTON, OHIO, A CORPORATION OF DELAWARE.

SYSTEM OF GAS CONTROL.

Application filed February 3, 1917. Serial No. 146,542.

*To all whom it may concern:*

Be it known that we, CHARLES F. KETTERING and WILLIAM A. CHRYST, citizens of the United States of America, residing at Dayton, county of Montgomery, and State of Ohio, have invented certain new and useful Improvements in Systems of Gas Control, of which the following is a full, clear, and exact description.

The present invention relates to fuel control systems for internal-combustion engines and particularly for systems of control for gaseous fuel, such as natural gas.

One object of the invention is to admit gaseous fuel automatically to the engine intake when the engine is in the process of being started.

A further object is to shut off the supply of fuel automatically when the engine stops either by reason of control by an operator, by reason of the operation of an automatic stopping device, or by accident such as a temporary discontinuance in the gas supply or failure of the ignition apparatus to function. In any event the dangerous escape and waste of gas through the engine is prevented.

One manner of carrying out these objects is to provide the engine intake with a valve normally closing said intake when the engine is at rest, and to provide that when the ignition apparatus is brought into operation at the starting of the engine this valve will be automatically opened and will remain open substantially continuously during the operation of the engine, so that the flow of gas into the engine intake will not be affected by the operation of the ignition system. Then it is provided that when the engine is stopped by the ignition system becoming inoperative, this valve shall automatically close.

In this connection it is provided that the tendency for the supply of gas to flow into the engine intake shall assist in closing the valve upon the stopping of the engine.

In carrying out the foregoing objects in connection with a battery charging system including an internal-combustion engine connected with a dynamo operable as a motor on current from a battery to start the engine or as a generator to charge the battery, it is preferably provided that the controller which connects the battery with the dynamo for engine starting purposes shall also connect the battery with the ignition apparatus and with an electrically operated valve to open up the engine intake to the fuel supply. It is provided that the controller shall maintain these connections during the generating operation of the dynamo, but that the controller shall operate automatically upon a tendency for the battery to discharge through the dynamo, to break these connections to prevent battery discharge and the escape and waste of fuel. This battery discharge would tend to occur upon a certain decrease in engine speed or upon failure of the dynamo to function properly at normal engine speed.

A further object of the present invention is to provide means for automatically controlling the flow of fuel to a combustion engine, wherein the mechanical elements of said means will be compact in structure and readily manufactured at small cost.

Further objects and advantages of the present invention will be apparent from the following description, reference being had to the accompanying drawing, wherein preferred embodiments of the present invention are clearly illustrated.

In the drawings:

Fig. 1 is a diagrammatic view illustrating the engine and the electrical circuits and connections embodied in one form of the present invention but showing only the relation of the invention to an ignition circuit.

Fig. 1ᴬ is a wiring diagram of the circuit shown in Fig. 1.

Figure 1:
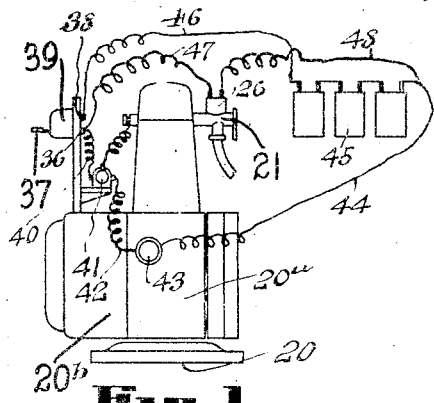
Figure 2:
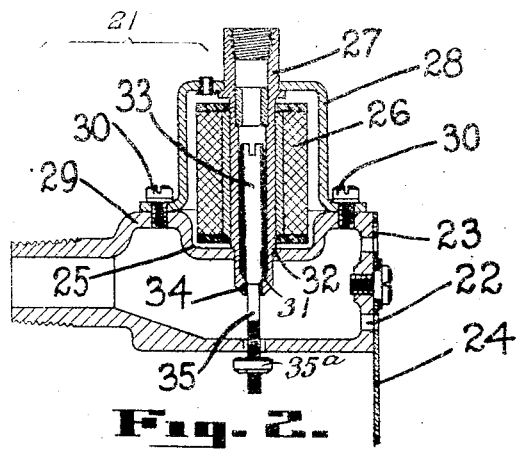
Fig. 2 is a detail sectional view of one form of valve mechanism for embodying the present improvements.

Referring to the drawing, and more particularly to Figs. 1 and 2, the numeral 20 designates a combined gas engine and electric unit of substantially the same type as that shown, described and claimed in our Patent No. 1,341,327, dated May 25, 1920, and our co-pending application Serial No.

120,098, filed September 14, 1916. The unit 20 includes engine 20ᵃ and dynamo 20ᵇ.

The present type of engine, however, instead of operating on fuel such as gasoline, kerosene, etc., is especially adapted to operate with natural gas as fuel. That is, in communities wherein natural gas is plentiful and of low cost, it has been found advantageous to provide for the use of this gas as a fuel for the engine.

It is particularly advantageous where fuel of this type is employed, that the flow thereof to the engine be automatically controlled. That is, as soon as it is desired to bring the engine into operation, the flow of gas should be readily permitted. However, it is of greater importance that as soon as the engine ceases to operate, either through being stopped by an attendant or by being stopped inadvertently, the flow of gas should be effectually shut off and prevented from escaping to the engine, which is then in a non-operative condition.

The numeral 21 designates as a whole a fuel mixer including a casing 29, provided with an air inlet 22 which is manually controlled by means of the shiftable valve disc 23, provided with a handle 24. This casing 29 is preferably of such conformation that a depression is formed in one side thereof, as at 25, and is adapted to provide a recess into which the solenoid may extend.

This coil 26 is covered by means of a housing 28, suitably secured to the casing 29, by means of the screws 30, suitable openings being formed at the top of the housing, in order to permit the entrance and exit of electric terminals, to connect the solenoid coil 26 with suitable circuit connections described hereinafter.

A nozzle 27 extends through the housing 28, down through the coil 26, the end of said nozzle projecting through the casing 29, and communicating with the interior of said casing. This nozzle 27 is provided with a shoulder 32, which limits the extent of downward movement of the nozzle by abutting against the wall of the casing 29.

The outer end of nozzle 27 may be connected with a suitable source of fuel gas supply by a pipe or other means. Concentric with this nozzle, and adapted to slidably fit therein, is a core 33 provided with a reduced head or valve portion 34. This valve portion 34 has a ground fit with a valve seat portion 31 provided in the nozzle 27, which will effectually prevent the passage of gas from the nozzle to the mixing chamber, at such times as the core is in the position shown in Fig 2.

It is apparent that the nozzle 27 supports the coil 26 and that the housing 28 assists in supporting the nozzle 27.

An extended end portion 35 of the core 33 projects through the open end of the nozzle at 31 and through the opposite side of the casing 29 which acts as a guide for the core. The end portion 35 is threaded to receive a nut 35ᵃ which serves as a stop to limit the upward movement of the core 33. By changing the position of nut 35ᵃ, the amount of opening of the gas valve may be varied to vary the speed of the engine. In this manner the power plant may be adjusted to vary the electrical output.

As has been stated above, the solenoid coil 26 has certain circuit connections. In Figs. 1 and 1ᴬ, this coil 26 is shown as interposed in a branch from the ignition circuit. The ignition circuit includes battery 45, wire 44, timer 43, wire 42, ignition coil 41, wire 40, contact 36, contact 37ᵃ moved by handle 37, contact 38, and wire 46 to battery 45. The branch from the ignition circuit includes wire 48, gas valve coil 26 and wire 47. It will be seen that as soon as the ignition circuit is closed by the operation of the handle 37, see Figs. 1 and 1ᴬ, the coil 26 will become energized and thereby attract the core 33 and raise the same, so as to open the lower end of the nozzle 27 at 31, and permit gas to pass through the nozzle into the interior of the mixing chamber. This gas will of course become mixed with the air which is passed through the air inlet valve 22, and will then be sucked into the engine cylinder to form the fuel charge.

As has been clearly set forth in our above-mentioned co-pending application, Serial No. 120,098, filed September 14, 1916, the handle 37 controls not only the closing of the ignition circuit, but also the operation of the electric unit to start the engine.

Figure 5:
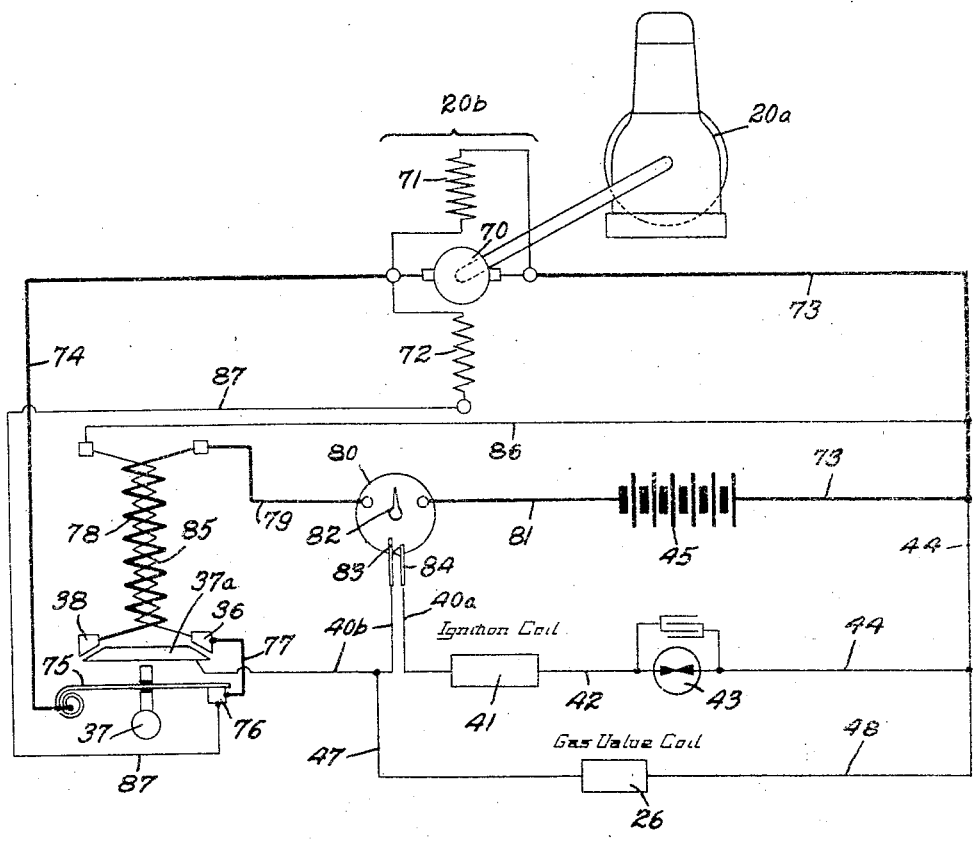
Fig. 5 is a wiring diagram showing the relation of the invention to ignition and battery charging circuits.

Fig. 5 shows the controller disclosed in the aforesaid application for connecting the battery with the dynamo, as well as for connecting the battery with the ignition apparatus and with the gas valve coil.

As disclosed in said application, and referring to Fig. 5, the dynamo 20ᵇ includes armature 70, shunt field 71 and series field 72, and is connected by wire 73 with battery 45, and by wire 74 with a spring contact 75, which supports handle 37 but is insulated therefrom. Contact 75 normally engages contact 76 which is connected by wire 77 with contact 36. Contact 38 is connected with a series magnet-coil 78 connected by wire 79 with ampere-hour-meter 80 connected by wire 81 with battery 45. Ampere-hour-meter 80 is provided with hand 82 actuated by said meter 80 to rotate clockwise during battery charging and to move a switch contact 83 out of engagement with contact 84 after a certain amount of charging has taken place.

Contact 36 is connected with a shunt magnet coil 85 connected by wire 86 with wire 73. Series field 72 is connected by wire 87 with contact 76. Coil 41 is connected by wire 40ᵃ with contact 84. Wire 40ᵇ connects contact 83 and wire 47 with contact 37ᵃ which is arranged to engage contacts 36 and 38.

To start the engine, handle 37 is moved to separate contact 75 from contact 76 whereupon the short circuit around series field 72 will be broken, and to move contact 37ᵃ into engagement with contacts 36 and 38, whereupon the dynamo 20ᵇ will be connected with the battery 45 and will operate as a cumulative compound motor. At the same time the ignition devices 41, 43 and the gas valve coil 26 will be connected with the battery. Ignition for the engine will be provided and the gas valve will be opened.

After the engine becomes self-operative and the dynamo generates a voltage in excess of battery voltage, the magnet coils 78 and 85 will act cumulatively to hold the contact 37ᵃ in engagement with contacts 36 and 38 in order to maintain the circuit connection between the battery and the dynamo during the battery charging operation.

In case the engine speed should decrease below a certain amount so that the battery would discharge through the dynamo, the coils 78 and 85 will act in opposition to one another with the result that the contact 37ᵃ will no longer remain in engagement with contacts 36 and 38 but will drop away therefrom to disconnect the battery from the dynamo, from the ignition apparatus and from the gas valve coil. When this occurs the gas valve will close automatically and prevent escape of gas through the engine or through the fuel mixer.

Stopping of the engine might occur in case of a substantial decrease in the gas fuel supply and would occur if the supply were cut off entirely, as often happens in the case of the supply of natural gas. If, after the engine had stopped, and before the engine could be started again, the gas should come on again, there would be an escape of gas into the surrounding atmosphere, which would be dangerous and wasteful were it not for the provision of means for automatically shutting off the supply of gas to the engine, as herein provided for.

When the battery has been charged a certain amount the ampere-hour-meter hand 82 causes the ignition circuit to be broken by separating contacts 83, 84. The engine will stop for lack of ignition. Escape of gas will be prevented by the operation of the automatic gas valve as previously described.

Figure 3:
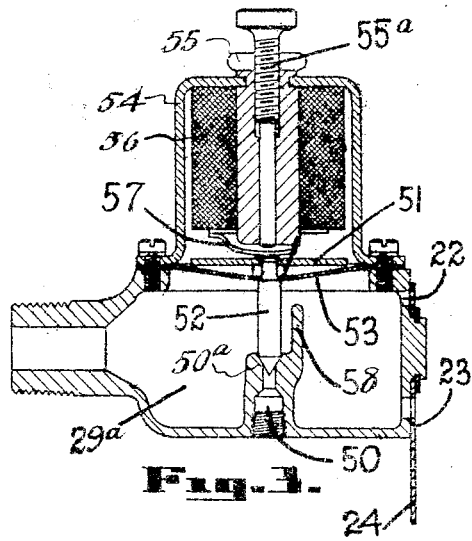
Fig. 3 is a view similar to Fig. 2, of a modified form of the present invention.

In the modified form of the invention shown in Fig. 3, the nozzle 50 through which gas enters the mixing chamber is formed integrally with the casing 29ᵃ, and is provided with a valve seat 50ᵃ. Casing 29ᵃ supports a flexible diaphragm 53 supporting magnet armature disc 51 which in turn supports a valve 52 cooperating with the seat 50ᵃ. Casing 29ᵃ supports housing 54 within which is mounted a core 55 supporting a magnet coil 56, and a spring 57 for yieldingly maintaining valve 52 in closed position.

Now, as soon as the magnet 56 in this form of the invention is energized, it will attract the disc 51 and thereby flex the diaphragm toward the core 55 and thus lift the valve 52, to such a position as to readily permit the flow of gas through the nozzle 50.

An adjusting screw 55ᵃ is provided for regulating the throw of the diaphragm 53, the disc 51, and the valve 52. Adjusting the screw 55ᵃ is for the same purpose as adjusting the nut 35ᵃ shown in Fig. 2.

In order to eliminate any objectionable effect of the air which passes to the mixing chamber through the openings 22 in the disc 23, a guard in the shape of the flange 58 is provided which deflects the air from passing directly over the opening through which the gas enters the mixing valve chamber. This flange arrangement also facilitates the mixture of the air and gas within the mixing chamber.

Figure 4:
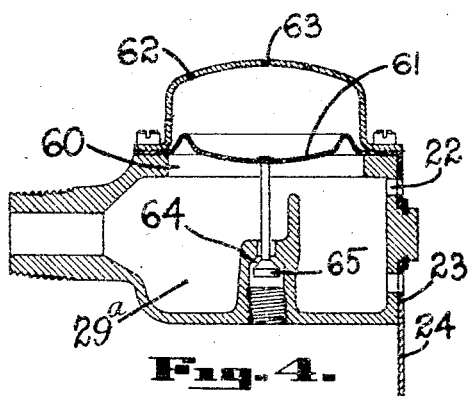
Fig. 4 is a view similar to Fig. 2 of a further modification.
Figure 1A:
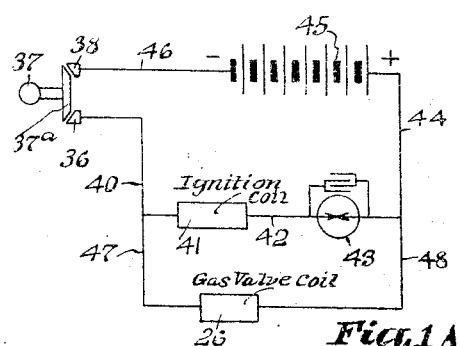

In Fig. 4, there is arranged a diaphragm which is actuated by means of atmospheric pressure control, as compared with the decreasing pressure in the mixing chamber, due to the suction effect of the engine piston. That is, on the suction stroke of the engine piston, all of the contents of the mixing chamber are sucked into the engine cylinder, and for a short interval the pressure within said mixing chamber is below that of atmospheric pressure. This nozzle opening is of sufficient size to permit a sufficient amount of gas to pass through the nozzle 64 to the mixing chamber for the next fuel charge.

In the structure shown in Fig. 4, a portion of the fuel mixer casing 29ᵃ which is open at 60, is enclosed by means of the diaphragm 61, which is secured to the walls of the casing in any suitable manner. Directly above this diaphragm there is a cover or casing 62, which is provided with a small opening to the atmosphere, as at 63.

It will be apparent that when the fuel mixer is connected with an internal-combustion engine such as, for example, a four cycle engine, the pressure in the mixing valve chamber will be reduced slightly below atmospheric pressure. This will permit the flexing of the diaphragm 61, which of course is under atmospheric pressure, due to the air passing through the opening 63, and also thereby depresses the valve 65 to permit the fuel to flow through the nozzle 64 into the casing 29ᵃ.

Now, as soon as the pressure in the casing 29ᵃ reaches substantially atmospheric pressure, it will tend to slightly raise the diaphragm 61, but because of the small diameter of the opening 63, the movement of the valve 65 will not be sufficient to close the opening of the nozzle 64, previous to the next suction stroke, at which time the pressure in the casing 29ª will again be decreased below that of the atmosphere.

The electrical connections shown in Figs. 1 and 5 are equally applicable to the structure shown in either Figs. 2 or 3.

It will be noted that these electrical connections are such that the gas valve coil is controlled independently of the ignition timer. This arrangement is advantageous in that the gas valve remains continuously open during the operation of the engine to permit gas to flow substantially uninterrupted to the intake of the engine. The gas is therefore present in the engine intake under substantially undiminished pressure to be admitted to the cylinder at the proper time.

With regard to the structure shown in Fig. 4, it will of course be understood that no electrical connections are required, the control of this apparatus depending entirely upon the continued operation of the engine.

While the embodiments herein shown and described constitute preferred embodiments of one form of the invention, it is to be understood that other forms might be adopted and various changes and alterations made in the shape, size, and proportion of the elements therein without departing from the spirit and scope of the invention.

What we claim is as follows:

1. In a fuel mixer for internal-combustion engines, the combination with a mixing chamber casing having an air inlet; of a fuel nozzle extending into said casing, and provided with a valve seat; a valve slidable within said nozzle and cooperating with said seat; and an electromagnet surrounding said nozzle and cooperating with said valve.

2. In a fuel mixer for internal-combustion engines, the combination with a mixing chamber casing having an air inlet; of a fuel nozzle extending into said casing and supported thereby and provided with a valve seat on the interior thereof; a valve slidable within said nozzle and cooperating with said valve seat; and an electromagnet surrounding and supported by said nozzle and cooperating with said valve.

3. In a fuel mixer for internal-combustion engines, the combination with a mixing chamber casing having an air inlet; of a fuel nozzle extending into said casing and supported thereby and provided with a valve seat on the interior thereof; a valve slidable within said nozzle and cooperating with said valve seat; an electromagnet surrounding and supported by said nozzle and cooperating with said valve; and a magnet housing surrounding said magnet and assisting in supporting said nozzle.

4. In a fuel mixer for internal-combustion engines, the combination with a mixing chamber casing having an air inlet; of a fuel nozzle extending into said casing and supported thereby and provided with a valve seat on the interior thereof; a valve slidable within said nozzle and cooperating with said valve seat and having a threaded extension projecting outside the casing; an adjusting nut cooperating with said extension; and an electromagnet cooperating with said valve.

5. In a fuel mixer for internal-combustion engines, the combination with a mixing chamber casing having an air inlet and a depressed portion providing a recess; of a fuel nozzle extending through said recess and into said casing, said nozzle having a valve seat; a valve slidable within said nozzle and cooperating with said seat; and a magnet coil projecting into said recess and surrounding said nozzle.

6. In a fuel mixer for internal-combustion engines, the combination with a mixing chamber casing having an air inlet and a depressed portion providing a recess; of a fuel nozzle extending through said recess and into said casing, said nozzle having a valve seat; a valve slidable within said nozzle and cooperating with said seat; a magnet coil projecting into said recess and surrounding said nozzle; and a housing covering said recess and magnet.

In testimony whereof we affix our signatures in the presence of two subscribing witnesses.

CHARLES F. KETTERING.
WILLIAM A. CHRYST.

Witnesses:
J. W. McDonald,
O. D. Mowry.